United States Patent
Samanta et al.

(10) Patent No.: US 9,542,327 B2
(45) Date of Patent: Jan. 10, 2017

(54) SELECTIVE MIRRORING IN CACHES FOR LOGICAL VOLUMES

(71) Applicant: LSI Corporation, San Jose, CA (US)

(72) Inventors: Sumanesh Samanta, Bangalore (IN); Saugata Das Purkayastha, Bangalore (IN); Sourav Saha, Bangalore (IN); Mohana Rao Goli, Banglore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 267 days.

(21) Appl. No.: 14/337,409

(22) Filed: Jul. 22, 2014

(65) Prior Publication Data
US 2016/0026575 A1   Jan. 28, 2016

(51) Int. Cl.
*G06F 12/08* (2016.01)

(52) U.S. Cl.
CPC ....... *G06F 12/0866* (2013.01); *G06F 12/0868* (2013.01); *G06F 12/0888* (2013.01); *G06F 2212/1016* (2013.01); *G06F 2212/222* (2013.01); *G06F 2212/286* (2013.01)

(58) Field of Classification Search
CPC   G06F 3/0689; G06F 12/0864; G06F 12/0866; G06F 12/0873; G06F 2212/286
See application file for complete search history.

(56) References Cited

U.S. PATENT DOCUMENTS

| | | |
|---|---|---|
| 6,467,022 B1 | 10/2002 | Buckland et al. |
| 6,567,889 B1 | 5/2003 | Dekoning et al. |
| 8,234,478 B1 * | 7/2012 | Roberts .............. G06F 12/0895 711/167 |
| 2009/0210620 A1 | 8/2009 | Jibbe et al. |
| 2013/0198448 A1 * | 8/2013 | Ish ..................... G06F 12/0871 711/113 |
| 2014/0019688 A1 | 1/2014 | Ghodsnia et al. |

* cited by examiner

*Primary Examiner* — Gary W Cygiel

(57) ABSTRACT

Methods and structure for selective cache mirroring. One embodiment includes a control unit and a memory. The memory is able to store indexing information for a multi-device cache for a logical volume. The control unit is able to receive an Input/Output (I/O) request from a host directed to a Logical Block Address (LBA) of the logical volume, to consult the indexing information to identify a cache line for storing the I/O request, and to store the I/O request at the cache line on a first device of the cache. The control unit is further able to mirror the I/O request to another device of the cache if the I/O request is a write request, and to complete the I/O request without mirroring the I/O request to another device of the cache if the I/O request is a read request.

20 Claims, 9 Drawing Sheets

I/O REQUEST (LBA) →FORMULA→ CACHE LINE X

CACHE METADATA

CHECK →

| CACHE LINE | AVAILABLE? |
|---|---|
| X | NO |
| X+1 | NO |
| X+2 | NO |
| X+3 | NO |
| X+4 | NO |
| X+5 | NO |
| X+6 | NO |
| X+7 | NO |
| X+8 | NO |
| X+9 | NO |
| X+10 | NO |
| ... | NO |
| X+15 | YES |

US 9,542,327 B2

SELECTIVE MIRRORING IN CACHES FOR LOGICAL VOLUMES

FIELD OF THE INVENTION

The invention relates generally to storage systems.

BACKGROUND

In a storage system, a host provides Input/Output (I/O) requests to a storage controller. The I/O requests indicate that data should be written to, or read from, one or more Logical Block Addresses (LBAs) of a logical volume. The storage controller processes incoming I/O requests to correlate the requested LBAs with physical addresses on one or more storage devices that store data for the volume. The storage controller can then split an I/O request into individual requests that are each directed to a corresponding storage device for the logical volume in order to retrieve/store the data at the physical addresses. Storage controllers utilize caches in order to enhance the overall speed of processing.

SUMMARY

Systems and methods herein provide for enhanced cache processing at a storage controller. One exemplary embodiment includes a control unit and a memory. The memory is able to store indexing information for a multi-device cache for a logical volume. The control unit is able to receive an Input/Output (I/O) request from a host directed to a Logical Block Address (LBA) of the logical volume, to consult the indexing information to identify a cache line for storing the I/O request, and to store the I/O request at the cache line on a first device of the cache. The control unit is further able to mirror the I/O request to another device of the cache if the I/O request is a write request, and to complete the I/O request without mirroring the I/O request to another device of the cache if the I/O request is a read request.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

FIG. 5 is a block diagram illustrating an exemplary process for selecting a cache line.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
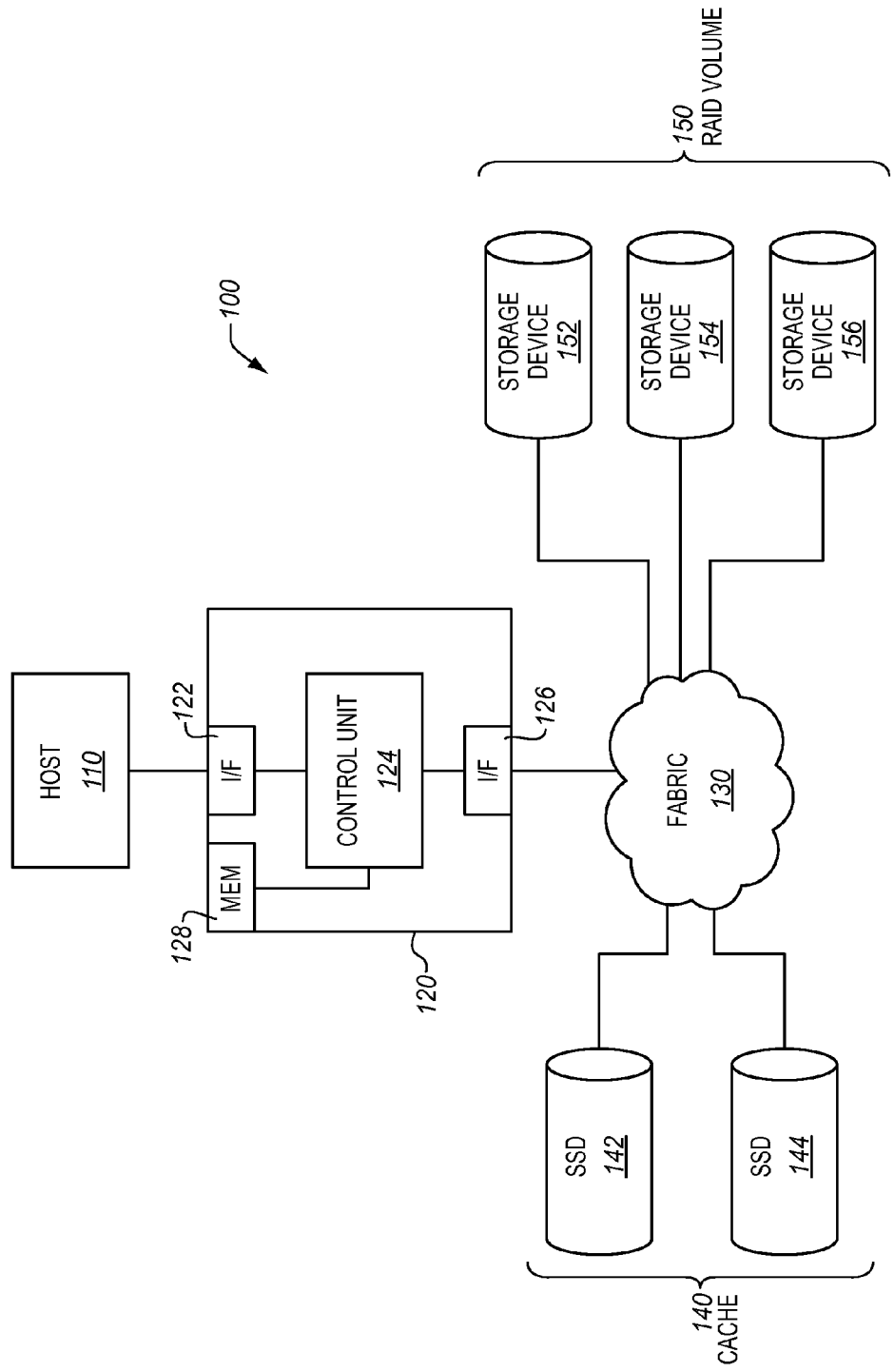
FIG. 1 is a block diagram of an exemplary storage system.

FIG. 1 is a block diagram of an exemplary Redundant Array of Independent Disks (RAID) storage system 100. In this embodiment, RAID storage system 100 includes host 110 (e.g., a server, generic computer, etc.), storage controller 120, fabric 130, cache 140, and RAID volume 150, which is maintained on storage devices 152, 154, and 156. In day-to-day operations, host 110 generates I/O requests that are directed to one or more LBAs of RAID volume 150, and transmits these commands to RAID controller 120. RAID controller 120 translates the commands into individual I/O requests and transmits the individual I/O requests via fabric 130 to specific storage devices (152, 154, and/or 156) in order to retrieve and/or alter data for RAID volume 150. RAID controller 120 utilizes cache 140 in order to enhance the speed of I/O operations for RAID volume 150. For example, cache 140 can be implemented in a location that allows for faster access than storage devices 152, 154, and 156 (e.g., it can be coupled via fewer intervening expanders/switches). In one embodiment, cache 140 provides a faster access technology than storage devices 152, 154, and 156 (e.g., Solid State Drives (SSDs) instead of spinning magnetic hard disks).

RAID controller 120 comprises any system, component, or device operable to manage a logical volume of data in accordance with RAID techniques (e.g., to manage a volume at RAID level 0, 1, 5, 6, etc.). RAID controller 120 includes frontend interface (I/F) 122 for interacting with host 110. In one embodiment, I/F 122 comprises a Peripheral Component Interconnect (PCI) interface for exchanging I/O requests and/or reporting I/O completions pertaining to RAID volume 150. RAID controller 120 also includes control unit 124, which handles the overall operations of RAID controller 120 as it manages RAID volume 150. Control unit 124 can be implemented as custom circuitry, a processor executing programmed instructions stored in program memory, or some combination thereof. Memory 128 (e.g., a Double Data Rate (DDR) Random Access Memory (RAM), a nonvolatile memory, etc.) stores indexing information (i.e., metadata) for cache 140. This indexing information enables control unit 124 to track which cache lines are presently used to store data, to track which cache lines correspond with which LBAs and/or physical addresses, etc.

Upon translating a host I/O request into a series of individual I/O requests, control unit 124 of RAID controller 120 transmits the individual I/O requests via backend I/F 126 along fabric 130. Backend I/F 126 comprises any interface for interacting with storage devices 152, 154, and 156, and/or cache 140 via fabric 130 (e.g., according to protocols for one or more of Small Computer System Interface (SCSI), Serial Attached SCSI (SAS), FibreChannel, Ethernet, Internet SCSI (ISCSI), PCI, etc.).

The individual I/O requests generated by RAID controller 120 can be sent to cache 140 in order to enhance overall processing speed. For example, if a read request is directed to data that is already available at cache 140, then the read request can be quickly completed (e.g., via cache SSDs 142 and/or 144) without waiting for a response from storage devices 152, 154, and/or 156. Similarly, data for a write request can be stored in the cache, reported to host 110 as completed, and then later "flushed" to the relevant storage devices (that is, cache 140 can operate in a write-back mode). If a cache miss occurs, then requests can bypass the cache and be sent for processing at storage devices 152, 154, and/or 156 in order to retrieve and/or alter the relevant data at RAID volume 150. Cache 140 can itself be implemented in a RAID configuration such as RAID level 0 (striping), RAID level 1 (mirroring), etc.

To maintain data integrity, if a write request has been reported as completed by RAID controller 120 when cache 140 is operating in a write-back mode, it should be ensured that the write request is eventually completed by flushing cached data for the request to storage devices 152, 154, and/or 156. However, power failures, hardware problems, or other issues can sometimes render a storage device of a cache unusable. In many caching systems, this would result in a failure of the overall cache and therefore a loss of data integrity, corrupting data on RAID volume 150. Fortunately, RAID controller 120 is capable of caching data for write requests, and mirroring the data to another storage device of cache 140 (e.g., by storing the data at SSD 142 as well as SSD 144). This means that data integrity is maintained even if one cache device catastrophically fails. However, there is a countervailing concern in that cache memory is often more expensive than the storage devices used for a RAID volume. Furthermore, the memory used to index a cache, such as Non-Volatile RAM (NVRAM) or DDR RAM, can be substantially expensive as well. Thus, it is undesirable to increase cache memory size beyond a certain point.

In order to balance these concerns relating to reliability, performance, and cost, command unit 124 of RAID controller 120 mirrors write request data to different storage devices of cache 140, but refrains from mirroring read request data within cache 140. Since data integrity for RAID volume 150 is maintained regardless of whether read requests are lost, read data does not need to be mirrored. Cache 140 therefore helps to balance a variety concerns relating to reliability, performance, and cost.

Fabric 130 comprises any suitable combination of communication channels operable to forward/route communications for RAID storage system 100, for example, according to protocols for one or more of Small Computer System Interface (SCSI), Serial Attached SCSI (SAS), FibreChannel, Ethernet, Internet SCSI (ISCSI), etc. In one embodiment, fabric 130 comprises a combination of SAS expanders that link to one or more targets.

Storage devices 152, 154, and 156 implement the persistent storage capacity of storage system 100, and are capable of writing and/or reading data in a computer readable format. For example, storage devices 152, 154, and 156 can comprise magnetic hard disks, solid state drives, optical media, etc. compliant with protocols for SAS, Serial Advanced Technology Attachment (SATA), Fibre Channel, etc.

Storage devices 140 implement storage space for one or more logical volumes, including RAID volume 150. A logical volume (such as RAID volume 150) comprises allocated storage space and data available at storage system 100. A logical volume can be implemented on any number of storage devices as a matter of design choice. Furthermore, storage devices need not be dedicated to only one logical volume, but can also store data for a number of other logical volumes.

The particular arrangement, number, and configuration of components described herein is exemplary and non-limiting. For example, in one embodiment cache 140 is implemented as an internal feature of RAID controller 120.

Figure 2:
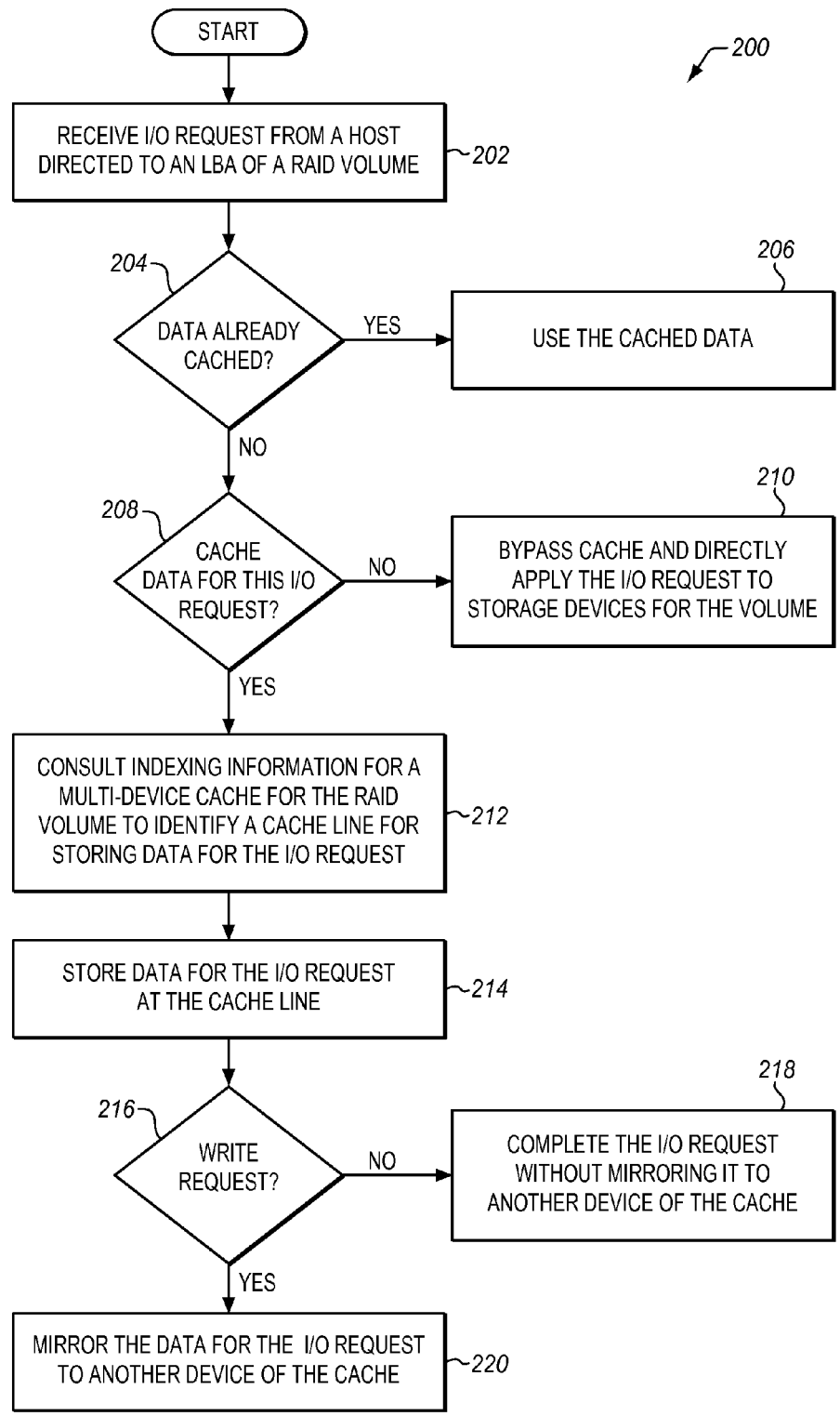
FIG. 2 is a flowchart describing an exemplary method to utilize a cache of a storage system.

FIG. 2 is a flowchart describing an exemplary method 200 to utilize a cache of a RAID storage system. Assume, for this embodiment, that RAID volume 150 has been initialized by RAID controller 120, and that RAID controller 120 has received an I/O request directed to RAID volume 150. Data for the I/O request will potentially be cached at cache 140.

In step 202, control unit 124 of RAID controller 120 receives an I/O request from host 110. The I/O request indicates that data should be read from (or written to) one or more LBAs of RAID volume 150. Control unit 124, upon receiving the I/O request, takes steps to determine whether to cache data for the I/O request. Thus, in step 204, control unit 124 determines whether data for the received I/O request has already been cached. For example, if the I/O request is a read request, the data could already be available via one or more cache lines. Alternatively, if the I/O request is a write request, the data to be written could potentially already be stored somewhere on the cache (for example, if the write request is a retry of a prior write request). If data for the I/O request has already been cached, then control unit 124 utilizes the cached data in step 206. However, if data for the request has not already been cached, then control unit 124 decides whether to cache data for the received I/O request in step 208. Deciding whether or not to cache the data can depend on whether the LBAs for the data have been subject to a large number of cache misses over a period of time (e.g., whether the data is "hot" data), can depend on whether the cache is operating as a write buffer, can depend on whether the I/O request is a read request or a write request, or any suitable metric. In one embodiment, control unit 124 always attempts to cache data for write requests, but only attempts to cache data for read requests if their LBAs have encountered a threshold number of cache misses.

If the data for the I/O request should not be cached, control unit 124 proceeds to step 210, where it bypasses cache 140 and applies the I/O request directly to the appropriate storage devices (152, 154, 156) of RAID volume 150. Alternatively, if the data for the I/O request should be cached, processing continues to step 212. If the data for the I/O request should be cached, control unit 124 consults the indexing information stored in memory 128 in order to identify a suitable cache line in step 212. In this embodiment, cache 140 is implemented as an elastic, set-associative cache. That is, the cache line to use for a given LBA and/or stripe of data is selected based on a formula. This technique saves memory overhead that would otherwise be wasted by tracking cache information via pointers (e.g., 4 byte or 8 byte pointers).

Once the cache line for the I/O request has been determined, control unit 124 stores data for the I/O request at the cache line in step 214. For example, if the I/O request is a read request, control unit 124 retrieves data from storage devices 152, 154, and 156, and then caches data retrieved from the storage devices in the cache line. This allows future read requests to be serviced directly from the cache. Alternatively, if the I/O request is a write request, data for the write request should be written to the cache line for later application to the appropriate storage device(s). Processing then continues to step 216, in which control unit 124 determines whether or not the I/O request is a write request or a read request. If the I/O request is a read request, read data is retrieved from the cache line and successful completion of the read request is reported in step 218. However, if the I/O request is a write request, then processing continues to step 220. Control unit 124 therefore mirrors the data for the I/O request to another storage device of cache 140 in order to increase the reliability of cache 140. In one embodiment, control unit 124 follows-up by reporting successful completion of the write request, and then ensures that data cached for the write request is successfully applied/flushed to the corresponding storage devices (152, 154, and/or 156). Once the data has been flushed, control unit 124 updates the indexing information to indicate that the cache line has become available again.

Even though the steps of method 200 are described with reference to RAID storage system 100 of FIG. 1, method 200 can be performed in other storage systems as desired. The steps of the flowcharts described herein are not all inclusive and can include other steps not shown. The steps described herein can also be performed in an alternative order.

EXAMPLES

In the following examples, additional processes, systems, and methods are described in the context of a cache for a RAID storage system.

Figure 3:
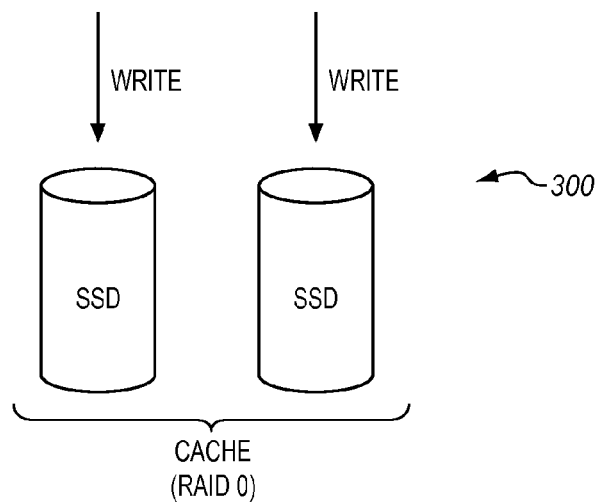
FIGS. 3-4 are block diagrams illustrating exemplary caching of a write request and a read request, respectively.
Figure 4:
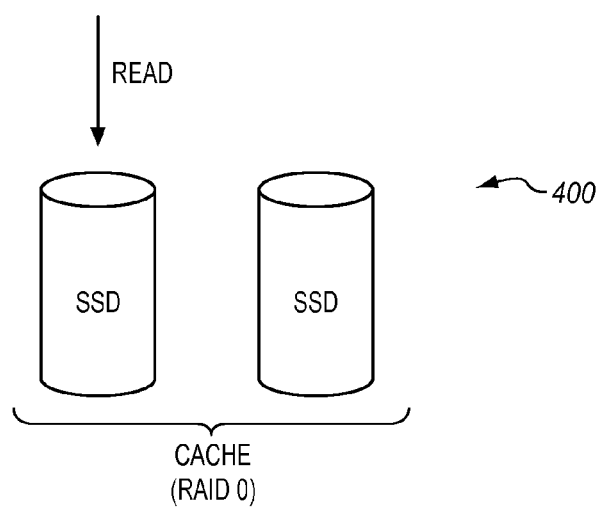

FIGS. 3-4 are block diagrams 300 and 400 illustrating exemplary caching of a write request and a read request, respectively, according to method 200. For both of these embodiments, cache 140 is implemented as a RAID 0 (striping) cache. FIG. 3 shows that data for a write request is mirrored on both drives (occupying different stripes of the RAID 0 volume), while FIG. 4 shows that data for a read request is cached to just one SSD.

FIG. 5 is a block diagram 500 illustrating an exemplary process for selecting a cache line. Assume, for this embodiment, that the cache is divided into cache lines of 4 KB each, and that the cache is hundreds of megabytes in size. Searching such a cache exhaustively would occupy a substantial amount of time and processing resources. Thus, according to FIG. 5, the cache line to write to is determined based on a formula. In this embodiment, the formula is Q=P % N, where Q is a candidate cache line, P is an LBA indicated in the I/O request, and N is the total number of cache lines within the cache as indicated by the indexing information maintained at the storage controller (and can vary depending on the physical configuration of the cache).

If the candidate cache line identified by this formula (in this example, cache line X) is presently occupied/filled with data for another LBA, or is otherwise unavailable, then the control unit for the RAID controller moves on to the subsequent/next cache line in the cache to check for availability, and so on, until an available cache line is found or a threshold number of cache lines have been checked (in this case, sixteen cache lines). If no available cache lines have been found by this time, the I/O request bypasses the cache and is sent directly by the RAID controller to storage devices implementing the RAID volume. However, if an available cache line is found, then data for the I/O request is stored in the available cache line. In this embodiment, the availability of each cache line is indicated by a bit of indexing information maintained at the RAID controller. Similar iterative processes to those shown in FIG. 5 (known as "set-associative" processes) can also be implemented when attempting to mirror a write request to another storage device of the cache.

In a further embodiment, the formula Q=P % N is modified by converting the output cache line Q into Q', where Q'=(Q&0xFF)<<12|(Q&0xFF000)>>12| (Q&0xFFF00F00). This ensures that cache locations are selected which are far away from each other, even for consecutive Q values.

Figure 6:
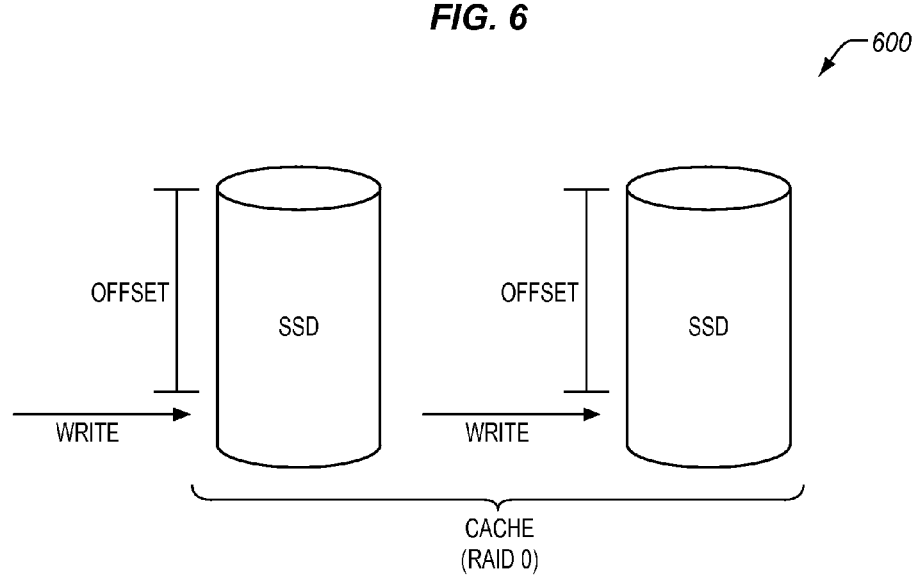
FIG. 6 is a block diagram illustrating an exemplary mirrored offset for a cache that enhances access time for the cache.

FIG. 6 is a block diagram 600 illustrating an exemplary mirrored offset for a cache that enhances access time for the cache. According to FIG. 6, data is written to a cache line at a first SSD of a cache, and a physical address offset is recorded. The offset can correspond to the physical address of a candidate cache line at the first SSD, the physical address of the cache line where the data was actually stored in the first SSD, etc. The data is then mirrored to the second SSD based on the same offset, which helps to increase the speed of retrieval (and the ease of tracking) the write request data and its mirrored counterpart. For example, the mirrored data can be applied to a cache line at the same offset, or to a subsequent cache line (within a threshold number of cache lines of the offset). The offset, and the drive identifier for each SSD, is stored in indexing information at the RAID volume, where it can be used to identify the location of data for the write request as stored on both SSDs.

Figure 7:
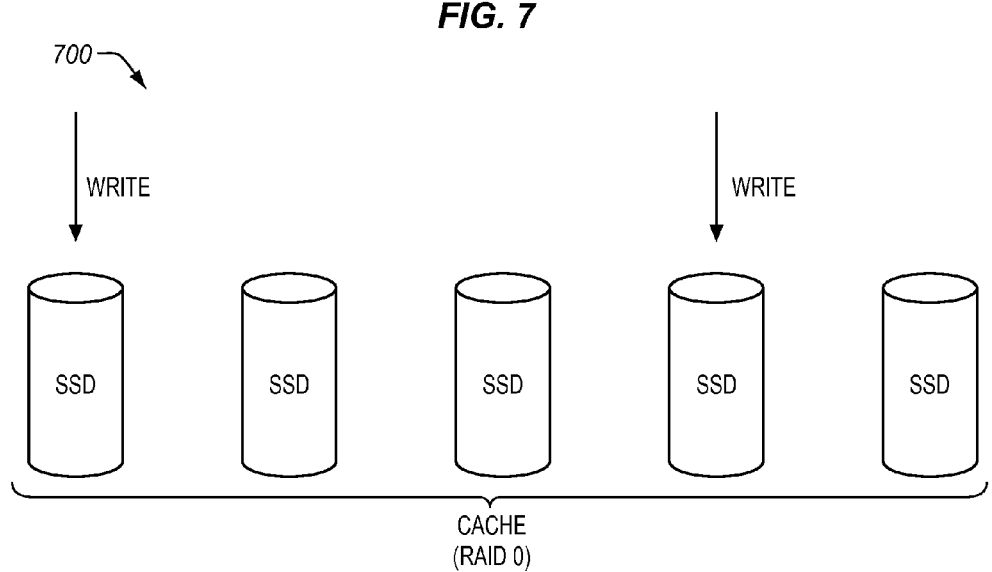
FIG. 7 is a block diagram illustrating an exemplary mirroring of a write request to different storage devices of a cache.

FIG. 7 is a block diagram 700 illustrating an exemplary mirroring of a write request to different storage devices of a cache. FIG. 7 illustrates that any suitable set of two (or more, if desired) storage devices of the cache can be used to store and mirror incoming write requests. In one embodiment, there are many storage devices that implement the cache, and a counter is maintained indicating the number of cache lines used by each storage device of the cache. The write request can be stored and mirrored to storage devices that have the lowest number of used cache lines (e.g., the two storage devices with the lowest number of used cache lines).

Figure 8:
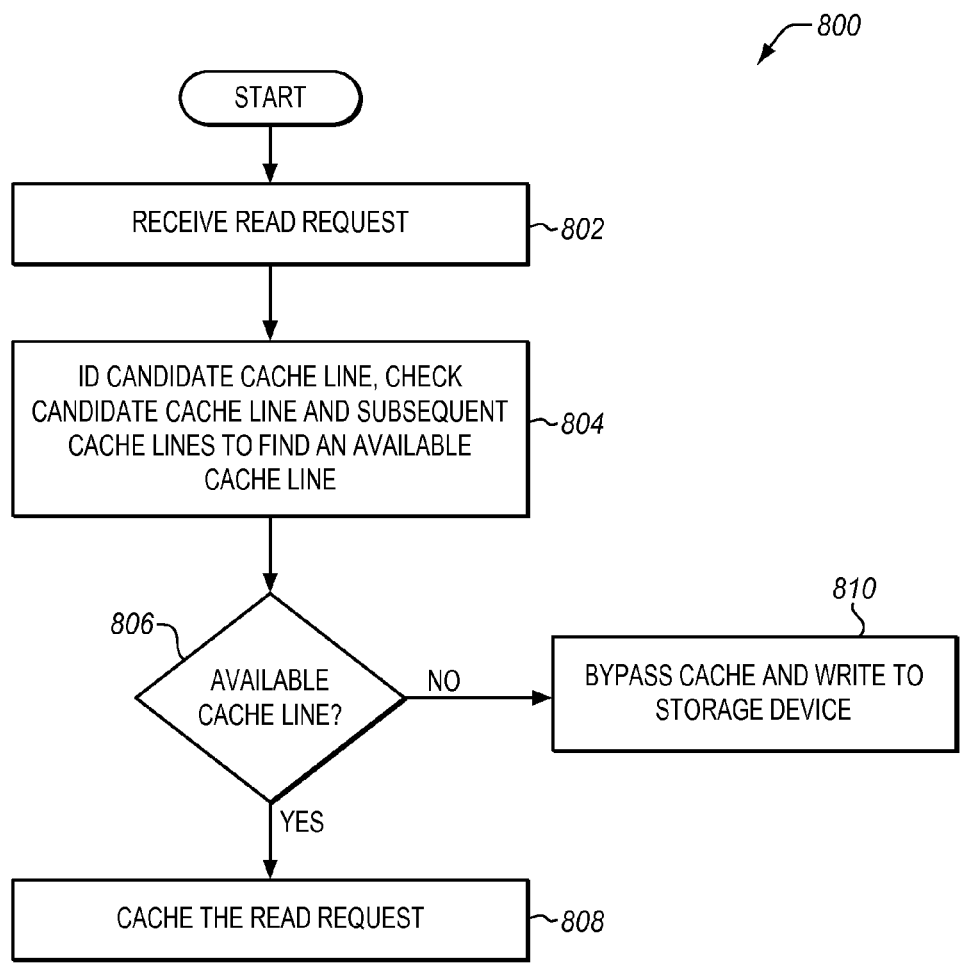
FIG. 8 is a flowchart illustrating an exemplary method for caching read requests.

FIG. 8 is a flowchart illustrating an exemplary method 800 for caching read requests. According to FIG. 8, a read request is received at a control unit of a RAID controller in step 802. If data for the read request is not already cached, and if the data for the read request should be cached (e.g., if the data for the read request is "hot" data), then the RAID controller determines a candidate cache line for the read request based on a formula (e.g., as discussed above) in step 804. The RAID controller further determines if the candidate cache line, or any of a set of subsequent cache lines, are available for caching data for the read request in step 806. If a cache line is available, the RAID controller acquires data from storage devices that maintain the RAID volume, and writes the acquired data to the cache line in step 808. This information can then be passed on to the host. However, if none of the checked cache lines are available, then the RAID controller bypasses the cache, and applies the read request directly to one or more of the storage devices that implement the RAID volume in step 810.

Figure 9:
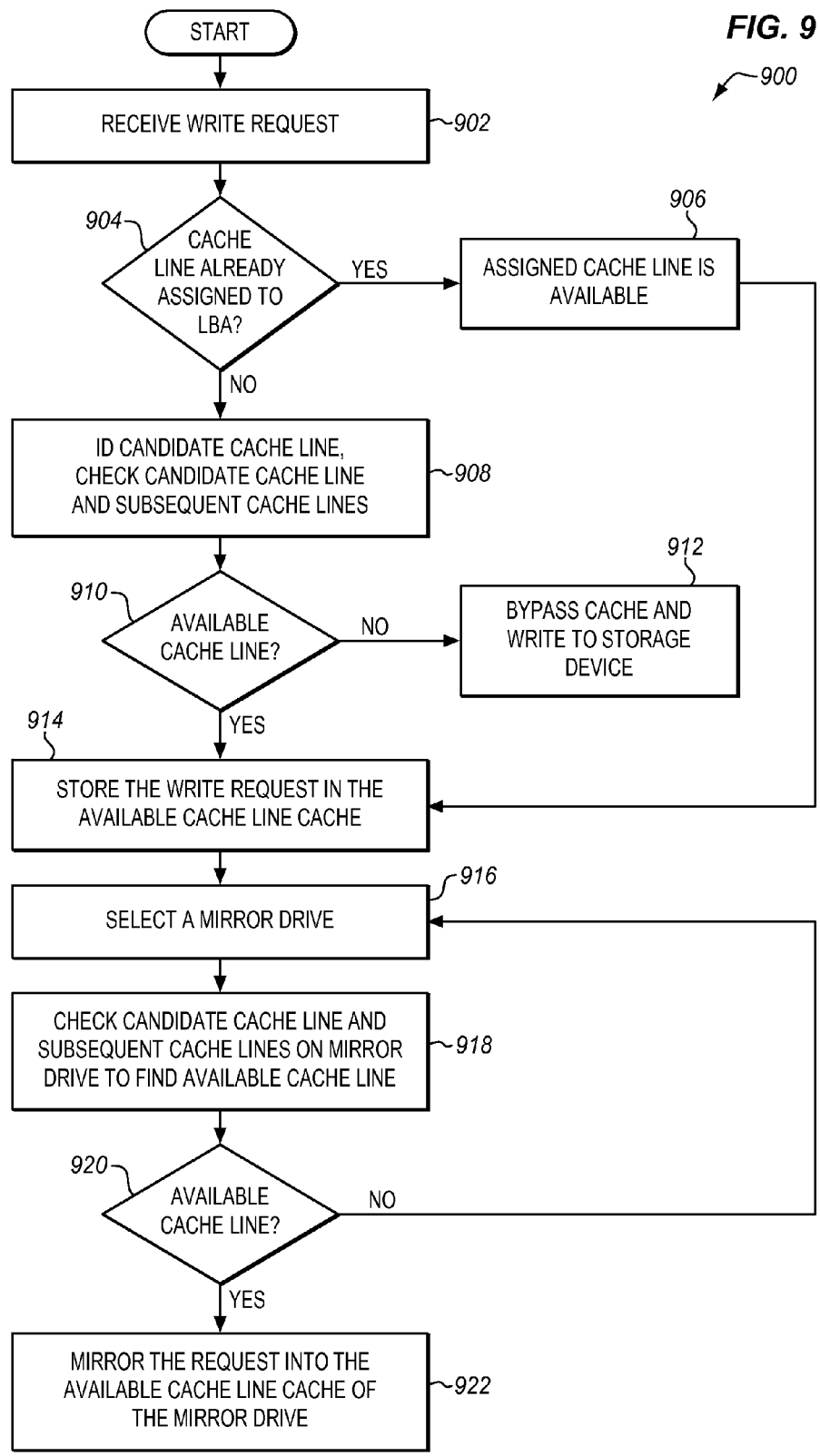
FIG. 9 is a flowchart illustrating an exemplary method for caching write requests.

FIG. 9 is a flowchart illustrating an exemplary method 900 for caching write requests. According to FIG. 9, in step 902 a control unit of a RAID controller receives a write request from a host, directed to an LBA on a RAID volume. The control unit engages in processing to determine whether the write request should be cached, and determines that the write request should be cached. The control unit then checks in step 904 to determine whether a cache line is already assigned to store data for the LBA (e.g., in order to service a read request that has since been completed). If there is a cache line already assigned to the LBA, then the control unit flags the cache line as available in step 906, and proceeds to step 914. Alternatively, if no cache line is already assigned to the LBA (i.e., if there is no cache line presently storing data for the requested LBA), then processing continues to step 908, in which the control unit uses a formula to identify a candidate cache line. The control unit then checks the candidate cache line (and/or subsequent cache lines) for availability. If none of the checked cache lines are available in step 910, then the control unit bypasses the cache by applying the write command directly to the storage device(s) for the RAID volume in step 912. However, if a cache line is available, then processing continues to step 914. In step 914, the control unit stores the write request in the available cache line.

Now that the request has been written to a cache line, all that remains before reporting completion to the host is mirroring the cache line to another storage device of the cache. To accomplish this result, the control unit selects a mirror drive (i.e., any storage device of the cache that is distinct from the storage device that was already used to cache the write request) in step 916. In step 918, the control unit checks the candidate cache line on the mirror drive (i.e., the cache line with the same offset on the drive as the candidate cache line on the prior drive) and/or subsequent cache lines in order to find an available cache line. If there are no available cache lines in step 920, then processing continues to select another mirror drive in step 916, and so on, until all mirror drives have been checked. If no cache lines on any mirror drive are available, the process terminates, the cached write request is evicted, and the write request bypasses the cache for direct application to the storage device(s) for the RAID volume. However, if an available cache line is found in step 920, then the write request is mirrored into the available cache line in step 922. Then, the storage controller reports successful completion of the write request to the host, and later flushes the cached data to the appropriate storage devices for the RAID volume. In some embodiments, the write mirror might already have been allocated, which can occur, for example, if a hot write has been directed to the same LBA before, and was cached.

Figure 10:
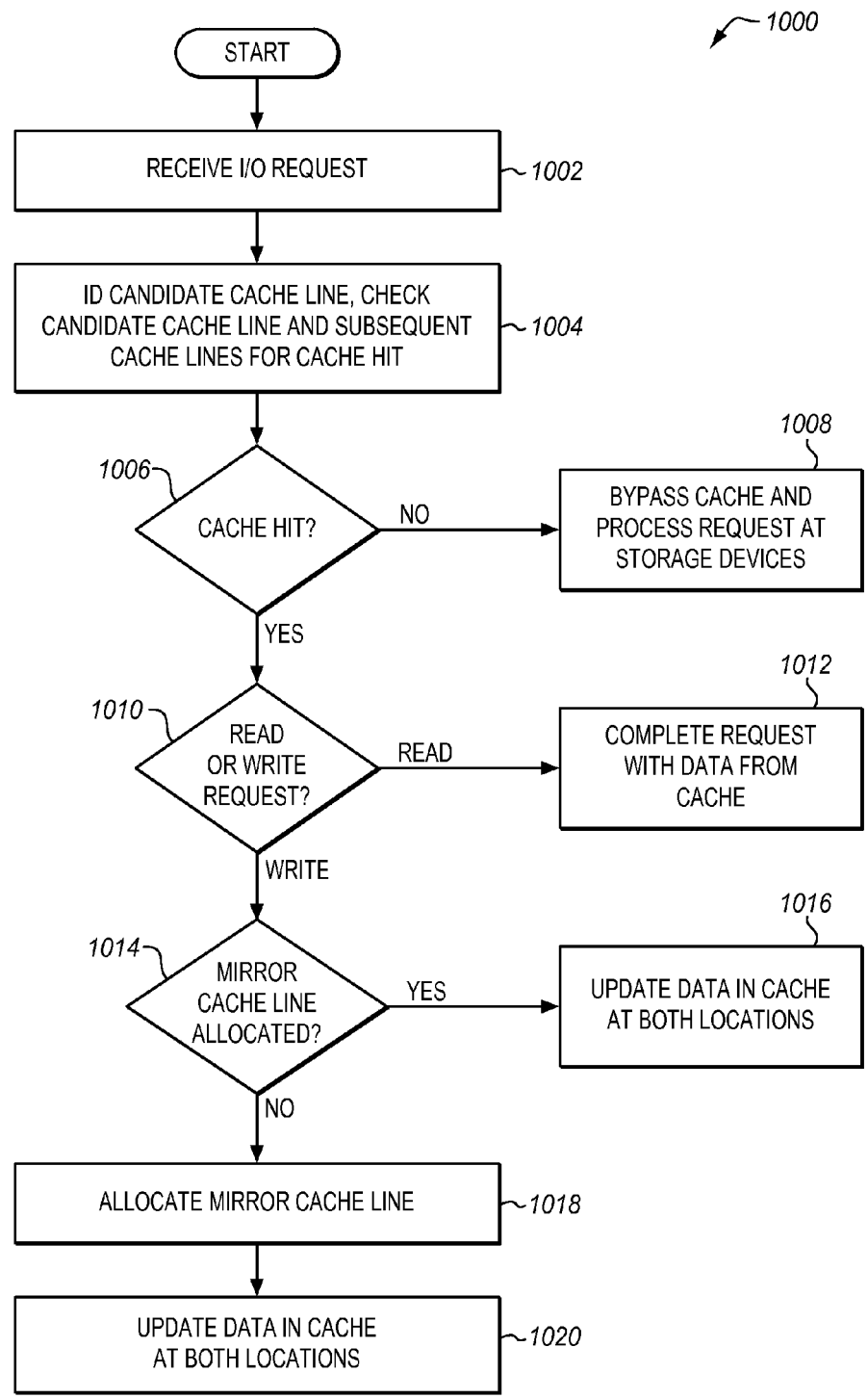
FIG. 10 is a flowchart illustrating an exemplary method for handling incoming I/O requests directed to a cache.

FIG. 10 is a flowchart illustrating an exemplary method 1000 for handling incoming I/O requests directed to a cache. According to method 1000, a control unit of a RAID controller receives an I/O request from a host that is directed to one or more LBAs of a RAID volume in step 1002. In step 1004, the control unit identifies a candidate cache line at the cache (e.g., based on a formula discussed above), and checks the candidate cache line and a set of subsequent cache lines for a cache hit. If there is no cache hit in step 1006, then the I/O request experiences a cache miss, and the I/O request therefore bypasses the cache for processing at the storage devices that maintain the RAID volume in step 1008. If enough cache misses occur for a given LBA (or stripe), it can be advisable to cache data for the LBA (or stripe) as described in methods 800-900 of FIGS. 8-9. Any known technique may be used to decide which requests should be cached and which should not. For example, metrics can be implemented to track "hot" LBAs which are often accessed, the system can operate in a "write buffer" mode where all incoming writes are cached, etc.

If a cache hit occurs, then processing continues to step 1010, where the control unit of the RAID controller determines whether the I/O request is a read request or a write request. If the I/O request is a read request, then the control unit completes the I/O request with data from the appropriate cache line in step 1012. However, if the I/O request is a write request, processing continues to step 1014, where the control unit checks to determine whether a "mirror cache line" has also been allocated on a different storage device of the cache. If a mirror cache line has already been allocated, then in step 1016, the control unit updates the cache lines at both locations based on the newly received I/O request. However, if a mirror cache line has not yet been allocated, then the control unit selects a mirror cache line at another storage device of the cache (e.g., based on techniques described above) in step 1018, and updates the cache lines at both locations based on the newly received I/O request in step 1020.

Figure 11:
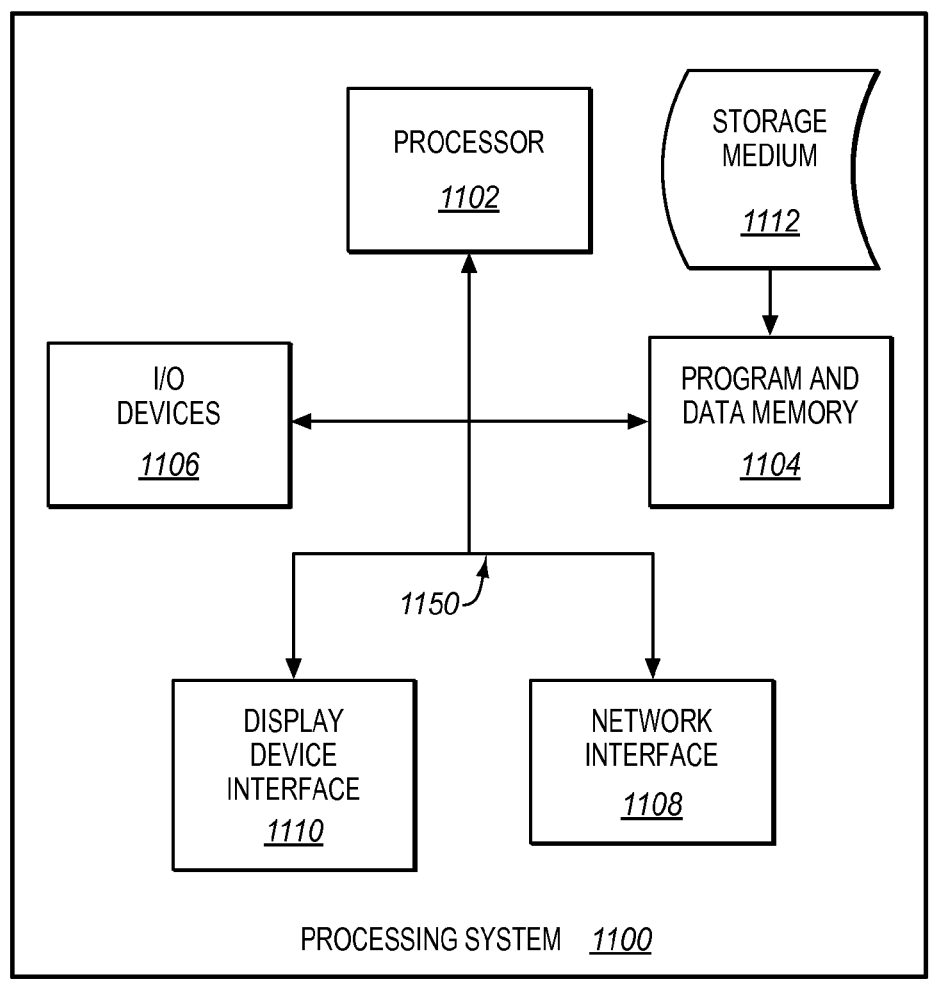
FIG. 11 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of RAID controller 120 to perform the various operations disclosed herein. FIG. 11 illustrates an exemplary processing system 1100 operable to execute a computer readable medium embodying programmed instructions. Processing system 1100 is operable to perform the above operations by executing programmed instructions tangibly embodied on computer readable storage medium 1112. In this regard, embodiments of the invention can take the form of a computer program accessible via computer readable medium 1112 providing program code for use by a computer (e.g., processing system 1100) or any other instruction execution system. For the purposes of this description, computer readable storage medium 1112 can be anything that can contain or store the program for use by the computer (e.g., processing system 1100).

Computer readable storage medium 1112 can be an electronic, magnetic, optical, electromagnetic, infrared, or semiconductor device. Examples of computer readable storage medium 1112 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1100, being suitable for storing and/or executing the program code, includes at least one processor 1102 coupled to program and data memory 1104 through a system bus 1150. Program and data memory 1104 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1106 (including but not limited to keyboards, displays, pointing devices, etc.) can be coupled either directly or through intervening I/O controllers. Network adapter interfaces 1108 can also be integrated with the system to enable processing system 1100 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1110 can be integrated with the system to interface to one or more display devices, such as printing systems and screens for presentation of data generated by processor 1102.

What is claimed is:

1. A system comprising:
   a memory operable to store indexing information for a multi-device cache for a logical volume; and
   a control unit operable to receive an Input/Output (I/O) request from a host directed to a Logical Block Address (LBA) of the logical volume, to consult the indexing information to identify a cache line for storing data associated with the I/O request, and to store the data at the cache line on a first device of the cache,
   wherein the control unit is further operable to mirror the data to another device of the cache if the I/O request is a write request, and to complete the I/O request without mirroring the data to another device of the cache if the I/O request is a read request,
   wherein the control unit is further operable to consult the indexing information to select a candidate cache line, to determine that the candidate cache line is unavailable, and to identify a number of subsequent cache lines to check for availability.

2. The system of claim 1, wherein:
   if one of the subsequent cache lines is available, the control unit is further operable to select the available cache line as the cache line to store the data, and
   if none of the subsequent cache lines are available, the control unit is further operable to process the I/O request by bypassing the cache.

3. The system of claim 2, wherein:
   the control unit is further operable to select the candidate cache line based on the formula $$Q=P\%N,$$

wherein Q is the candidate cache line, P is the LBA for the I/O request, and N is the total number of cache lines within the cache as indicated by the indexing information.

4. The system of claim 2, wherein:
   when mirroring the data to another device of the cache, the control unit is further operable to identify an offset of the candidate cache line within the first device, and to mirror the data to another cache line at another device based on the offset.

5. The system of claim 1, wherein
   the control unit is further operable, when mirroring the data, to consult the indexing information to determine that a corresponding cache line at another device is unavailable, and to identify a number of subsequent cache lines to check for availability,
   wherein if one of the subsequent cache lines is available, the control unit is further operable to use the available cache line to mirror the data, and
   if none of the subsequent cache lines are available, the control unit is further operable to evict the data from the cache line at the first device, and to process the I/O request by bypassing the cache.

6. The system of claim 1, wherein:
   the control unit is further operable to select another device from multiple other devices of the cache.

7. The system of claim 1, wherein:
   the system comprises a Redundant Array of Independent Disks (RAID) storage controller, the logical volume comprises a RAID volume and the cache comprises multiple Solid State Drives (SSDs) that are accessible via a backend interface of the RAID storage controller.

8. The system of claim 1, wherein the multi-device cache is implemented as a striped Redundant Array of Independent Disks (RAID) level 0 volume.

9. A method comprising:
   receiving an Input/Output (I/O) request from a host directed to a Logical Block Address (LBA) of a logical volume;
   consulting indexing information for a multi-device cache for the logical volume, in order to identify a cache line for storing data associated with the I/O request;
   storing the data at the cache line on a first device of the cache;
   mirroring the data to another device of the cache if the I/O request is a write request, wherein mirroring the data comprises,
      consulting the indexing information to determine that a corresponding cache line at another device is unavailable, and
      identifying a number of subsequent cache lines to check for availability; and
   completing the I/O request without mirroring the data to another device of the cache if the I/O request is a read request.

10. The method of claim 9, further comprising:
    consulting the indexing information to select a candidate cache line,
    determining that the candidate cache line is unavailable; and
    identifying a number of subsequent cache lines to check for availability,
    wherein if one of the subsequent cache lines is available, the method further comprises selecting the available cache line as the cache line to store the data, and
    wherein if none of the subsequent cache lines are available, the method further comprises processing the I/O request by bypassing the cache.

11. The method of claim 10, further comprising:
    selecting the candidate cache line based on the formula $$Q=P\%N,$$

wherein Q is the candidate cache line, P is the LBA for the I/O request, and N is the total number of cache lines within the cache as indicated by the indexing information.

12. The method of claim 10, wherein mirroring the data to another device of the cache comprises:
    identifying an offset of the candidate cache line within the first device; and
    mirroring the data to another cache line at another device based on the offset.

13. The method of claim 9,
    wherein if one of the subsequent cache lines is available, the method further comprises using the available cache line to mirror the data, and
    wherein if none of the subsequent cache lines are available, the method further comprises evicting the data from the cache line at the first device, and processing the I/O request by bypassing the cache.

14. The method of claim 9, further comprising:
    selecting another device from multiple other devices of the cache.

15. The method of claim 9, wherein:
    the cache comprises multiple Solid State Drives (SSDs) that are accessible via a backend interface of a Redundant Array of Independent Disks (RAID) storage controller, and the logical volume comprises a RAID volume.

16. The method of claim 9, wherein:

the multi-device cache is implemented as a striped Redundant Array of Independent Disks (RAID)level 0 volume.

17. A system comprising:

a memory operable to store indexing information for a multi-device cache for a logical volume; and a processor operable to receive an Input/Output (I/O) request from a host directed to a Logical Block Address (LBA) of the logical volume, consult the indexing information to identify a cache line for storing data associated with the I/O request, and store the data at the cache line on a first device of the cache, wherein the processor is further operable to mirror the data to another device of the cache if the I/O request is a write request, and complete I/O request without mirroring the data to another device of the cache if the I/O request is a read request, and wherein the processor is further operable to consult the indexing information to select a candidate cache line, determine that the candidate cache line is unavailable, and identify a number of subsequent cache lines to check for availability.

18. The system of claim 17, wherein:

if one of the subsequent cache lines is available, the processor is further operable to select the available cache line as the cache line to store the, data and if none of the subsequent cache lines are available, the processor is further operable to process the I/O request by bypassing the cache.

19. The system of claim 18, wherein:

the processor is further operable to select the candidate cache line based on the formula $$Q = P \% N,$$

wherein Q is the candidate cache line, P is the LBA for the I/O request, and N is the total number of cache lines within the cache as indicated by the indexing information.

20. The system of claim 18, wherein:

when mirroring the data to another device of the cache, the processor is further operable to identify an offset of the candidate cache line within the first device, and mirror the data to another cache line at another device based on the offset.

* * * * *